July 25, 1967  N. ROSENSTEIN  3,332,226
DISTORTED CRIMPED YARN
Original Filed Aug. 2, 1962
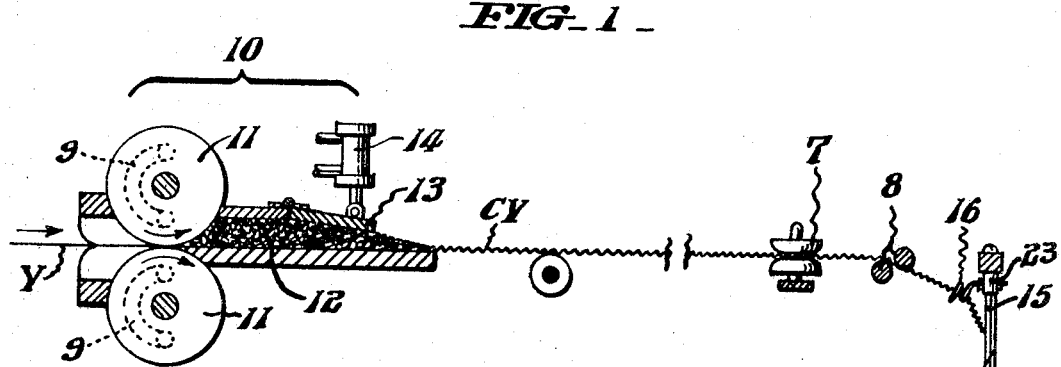
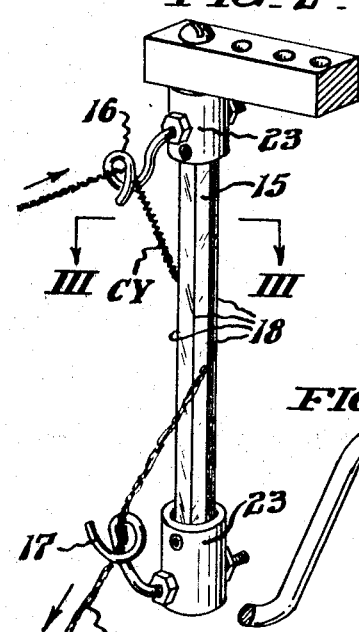
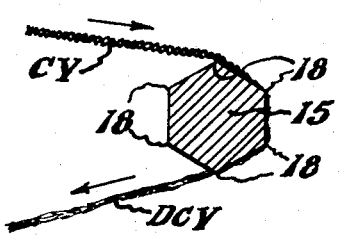
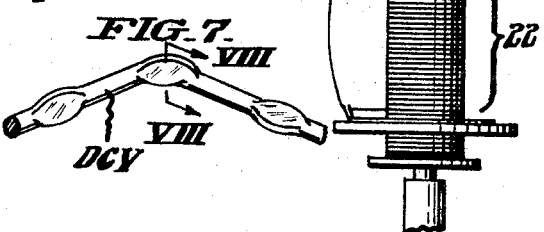
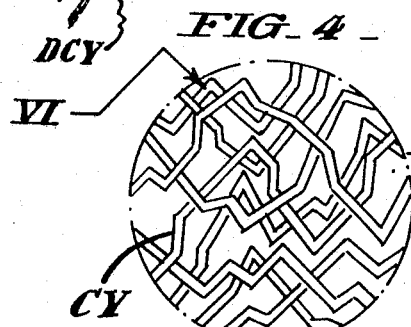
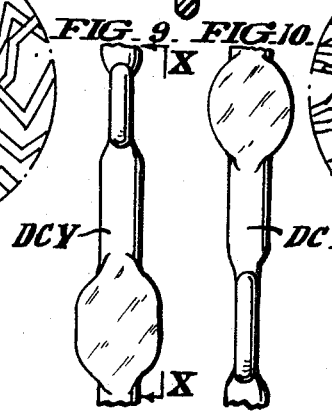
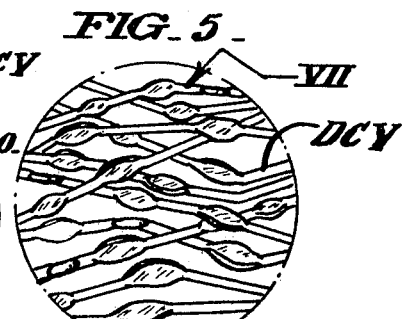
INVENTOR.
Nathan Rosenstein,
BY Paul & Paul
ATTORNEYS.

United States Patent Office 3,332,226
Patented July 25, 1967

3,332,226
DISTORTED CRIMPED YARN
Nathan Rosenstein, West Hartford, Conn., assignor to Spunize Company of America, Inc., Unionville, Conn., a corporation of Connecticut
Original application Aug. 2, 1962, Ser. No. 214,260. Divided and this application Apr. 6, 1965, Ser. No. 445,971
2 Claims. (Cl. 57—140)

This application is a divisional application of parent application Ser. No. 214,260, filed Aug. 2, 1962, now abandoned.

This invention relates to yarn produced by distorting or modifying the surface of the filaments of synthetic yarn. More specifically, this invention relates to a distorted-crimp synthetic yarn having legs of unequal lengths.

The prior patent to Rosenstein et al. No. 2,715,309 discloses an apparatus and method for producing crimped continuous filament yarn, such yarn comprising a synthetic material formed of V-shaped symmetrical crimps. These crimps are formed by forcing the continuous filament yarn through the nip of a pair of counter-rotating crimping rollers, into a zone of restriction such as a stuffing chamber or the like, in which the yarn has been accumulated, forming a back pressure, whereupon the yarn as it is fed into the zone of restriction is buckled and folded over upon itself again and again, thereby forming a multiplicity of substantially symmetrical V-shaped crimps.

Yarn produced according to the aforementioned patent, when formed into a fabric, is quite lofty and absorbent and has a texture comparable to that of proteinaceous fibers, often having a relatively rough feel due to the points of the V-shaped crimp. Also, such yarn when highly crimped has a pronounced tendency to contract, shortening the effective pile length when incorporated into pile fabrics. An important object of this invention is to provide a synthetic yarn which has many of the advantages of the prior art yarn just referred to, and yet has a smoother feel and a kinder, softer hand, and also has a sharply reduced tendency to contract lengthwise. More particularly, it is an object of this invention to provide a yarn, which when incorporated into a fabric, provides a characteristic akin to that of a smooth worsted as compared to a rougher "woolen" appearance.

Other objects and advantages of this invention will appear in further detail hereinafter, and in the drawings whereof:

FIG. 1 is a schematic view, in side elevation, showing an apparatus and method for producing yarn according to this invention;

FIG. 2 is an enlarged diagrammatic view in perspective, showing one portion of the apparatus;

FIG. 3 is an enlarged diagrammatic sectional view, taken as indicated by the lines and arrows III—III which appear in FIG. 2;

FIGS. 4 and 5 are drawings representing magnifications, as indicated by the microscope, respectively of prior art yarn and of yarn in accordance with this invention;

FIG. 6 represents a highly enlarged view, showing a typical representative segment of prior art yarn at the location indicated by the arrow in FIG. 4;

FIG. 7 is a greatly enlarged view of a segment of yarn according to this invention, as illustrated by the arrow in FIG. 5;

FIG. 8 is a sectional view of a distortion in a filament, taken as indicated by the lines and arrows VIII—VIII which appear in FIG. 7;

FIG. 9 is a plan view of the distortion appearing in FIG. 8; and

FIG. 10 is a face view of the distortion, looking as indicated by the arrows X—X which appear in FIG. 9.

Referring now to the specific form of invention selected for illustration in the drawings, FIG. 1 shows a stuffer-box crimper 10 having oppositely rotating crimp rolls 11 forcing the yarn Y into a stuffing box 12, having a release door 13, the pressure of which is controlled by a cylinder 14. This apparatus (which is conventional per se) forms crimped yarn CY composed of a multiplicity of substantially V-shaped crimps.

The number 9 designates internally arranged heating coils which may be of any desired type, such as coils carrying hot liquid or the like. This causes a heat-setting of the synthetic material as it is crimped between the rolls. The heat-setting means may be designed and arranged to provide for application of heat to the crimped filaments, such as dielectric heat or a conventional autoclave, for example, and the heat may be applied either immediately before, during or after crimping.

According to this invention, means are provided for distorting the crimp thus produced. This means includes a bar 15 having a multiplicity of flat edges 18 together with an entrance guide 16 and an exit guide 17. As shown, the crimped yarn cY passes through a pair of tension discs 7 and snubbing bars 8, and is wrapped at least a half wrap around the bar 15 (but it may be wrapped more or less) and is pulled under strong tension by feed rollers 20, 20 which are positively driven. Thus, the crimped yarn CY is maintained under substantial tension while it is pulled over the edge. The bar 15 is unheated and its edges do not cause curling of the yarn filaments but flatten out the V-shaped crimps as will further appear. The yarn is also drawn over another similar bar 15a, spaced from bar 15, which flattens out crimps that were not exposed to the flattening and distorting action of bar 15.

From feed rollers 20, the distorted-crimp yarn is passed through guides 21, 21a to a twister 22, or to any other equivalent equipment such as a winder, for example.

FIG. 2 shows the details of construction of the crimp-distortion apparatus. The bar 15 is provided with sleeves 23, 23 which are adjustable around the axis, thus providing for increasing or decreasing the amount of wrap of the crimped yarn CY around the bar 15, this being governed by the positions of the guides 16, 17. The number of wraps, for a hexagonal bar and for 70 denier 34 filament nylon, may vary from about one-half to two. Bar 15a, positioned at about right angles to bar 15, does not need any guides but they may be provided if necessary in other specific arrangements, and they may also be angularly adjustable.

As shown in FIG. 3, the bar 15 is hexagonal and has six flat edges, any number of which may be brought into effective use by simply varying the positions of the respective guides 16, 17. Bar 15a, similarly, is hexagonal as shown, but either bar may have any number of edges.

FIG. 4 shows a highly magnified view, as seen through a microscope, of prior art stuffer box crimped yarn, showing a considerable number of V-shaped crimps which have been formed by folding the yarn over and over upon itself, and by subjecting the folded portions to mechanical pressure within the stuffer box. By way of contrast, FIG. 5 shows similar yarn which has been subjected to the special crimp-distorting procedure of this invention. FIG. 5 shows filaments which are characterized by flattened, enlarged deformities, which have been produced by drawing the V-shaped crimps (particulary the apices of the V's) under tension angularly over the flat edge of the rod 15. These are formed by wiping or scraping the yarn over the flat edge, after heat-setting, and are responsible for the smoother feel and kinder hand of fabrics produced from the yarn. The flattening of the crimps is believed to be analogous to hammering on a sharp fold or bend in metal, in an attempt to straighten it, which produces a flattening effect where the metal was bent.

It is important to observe that the yarn filaments have only a few residual V-shaped crimps. The great majority of crimps have been flattened, leaving the apices of the V's in a variety fo distorted conditions, some of them twisted as well as flattened. These knobs or distortions are permanent and no further heat-setting is required.

FIGS. 6 and 7 illustrate schematically the nature of the modification that is understood to take place. As appears in FIG. 6, many of the V-shaped crimps are partially flattened due to the fact the yarn has been bent back upon itself and then subjected to high mechanical pressure. Thus, when the yan is subjected to tension, and such surface irregularities are drawn over the sharp edge of bar 15, such irregularities are flattened, producing the type of surface deformities (distorted crimps) shown schematically in FIG. 7. Also, the V-shaped crimps are very substantially reduced in angle.

This invention is applicable to yarn having V-shaped crimps formed in wide varieties of stuffer crimpers and in gear crimpers as well, and is not limited to yarn produced under U.S. Patent No. 2,715,309.

The product of this invention differs radically and surprisingly from ordinary crimped synthetic yarn and has an extraordinarily smooth, silky handle which has, to my knowledge, never been provided in any textured synthetic yarn.

The effect, according to this invention, is achieved with filaments of various cross-sections, including circular, triangular, rectangular, trilobal and others.

Although this invention has been disclosed with reference to specific forms thereof, it will be appreciated that various modifications may be made without departing from the spirit or scope of the invention. For example, reversals of parts, substitution of equivalent elements for those shown in the drawings, and the use of certain features of this invention independently of other features, are all intended to be included within the spirit and scope of this invention as defined in the appended claims.

Having thus described my invention, I claim:

1. Distorted crimp synthetic yarn comprising a plurality of filaments each of which is characterized by a substantially uniform cross-section interrupted by spaced apart, flattened distortions having intervening leg portions, said leg portions varying in length from one to the other.

2. Distorted crimp synthetic yarn having a silk-like hand comprising a plurality of heat-set thermoplastic filaments each of which is characterized by a substantially uniform cross-section interrupted by spaced apart distortions which are flattened in a direction extending along the longitudinal axis of the filament said distortions being spaced from one another by means of leg portions of unequal lengths.

References Cited

UNITED STATES PATENTS

| 2,316,245 | 4/1943 | Hunter | 57—140 X |
| 2,715,309 | 8/1955 | Rosenstein et al. | 57—140 |
| 2,975,474 | 3/1961 | Smith | 18—8 |
| 3,078,542 | 2/1963 | McFarren et al. | 28—72 |
| 3,110,059 | 11/1963 | Tallis et al. | 18—8 |
| 3,116,197 | 12/1963 | Kasey | 161—170 |
| 3,117,173 | 1/1964 | Adams | 264—210 |
| 3,127,915 | 4/1964 | Bottomley | 139—420 |

FRANK J. COHEN, *Primary Examiner.*

D. E. WATKINS, *Assistant Examiner.*